United States Patent

Schambre et al.

(10) Patent No.: US 6,726,283 B2
(45) Date of Patent: Apr. 27, 2004

(54) GEAR DRIVEN ACTUATOR FOR RETRACTABLE HEADREST

(75) Inventors: John E Schambre, Canton, MI (US); Marcus G Washington, Southfield, MI (US); David L Garber, Northville, MI (US); Louis D DeLellis, South Lyon, MI (US); Michael O Forker, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/146,296

(22) Filed: May 15, 2002

(65) Prior Publication Data

US 2003/0214169 A1 Nov. 20, 2003

(51) Int. Cl.[7] .................................................. A47C 1/10
(52) U.S. Cl. ........................... 297/410; 297/408; 297/61
(58) Field of Search ......................... 297/61, 408, 410, 297/378.12, 411.39, 216.12, 378.1

(56) References Cited

U.S. PATENT DOCUMENTS

| | | | |
|---|---|---|---|
| 4,082,354 A | 4/1978 | Renner et al. | |
| 4,193,631 A | 3/1980 | Hobley et al. | |
| 4,285,545 A | 8/1981 | Protze | |
| 4,650,250 A | 3/1987 | Krügener et al. | |
| 4,693,515 A | 9/1987 | Russo et al. | |
| 4,762,367 A | 8/1988 | Denton | |
| 4,923,250 A | * 5/1990 | Hattori | 297/410 |
| 4,978,169 A | 12/1990 | Shannon et al. | |
| 5,020,855 A | 6/1991 | Lindberg et al. | |
| 5,056,816 A | 10/1991 | Lutze et al. | |
| 5,080,437 A | 1/1992 | Pesta et al. | |
| 5,346,277 A | 9/1994 | Holobaugh et al. | |
| 5,435,624 A | * 7/1995 | Bray et al. | 297/362.11 |
| 5,507,553 A | * 4/1996 | Nishizawa et al. | 297/216.13 |
| 5,540,479 A | 7/1996 | Thomas et al. | |
| 5,681,079 A | 10/1997 | Robinson | |
| 5,738,411 A | 4/1998 | Sutton et al. | |
| 5,748,473 A | * 5/1998 | Breed et al. | 701/45 |
| 5,795,023 A | 8/1998 | Kayumi | |
| 5,826,942 A | 10/1998 | Sutton et al. | |
| 5,882,071 A | * 3/1999 | Fohl | 297/216.12 |
| 5,895,094 A | 4/1999 | Mori et al. | |
| 5,918,940 A | 7/1999 | Wakamatsu et al. | |
| 5,927,804 A | * 7/1999 | Cuevas | 297/216.12 |
| 5,975,637 A | * 11/1999 | Geuss et al. | 297/391 |
| 6,033,017 A | * 3/2000 | Elqadah et al. | 297/216.1 |
| 6,050,633 A | 4/2000 | Droual | |
| 6,192,565 B1 | * 2/2001 | Tame | 297/61 |
| 6,279,996 B1 | 8/2001 | Albrecht | |
| 6,290,299 B1 | * 9/2001 | Frisch et al. | 297/410 |
| 6,361,112 B1 | * 3/2002 | Wu | 297/391 |

* cited by examiner

*Primary Examiner*—Anthony D. Barfield
*Assistant Examiner*—Erika Garrett
(74) *Attorney, Agent, or Firm*—Donald J. Wallace

(57) ABSTRACT

A motor vehicle seat frame assembly has a headrest movable between an extended position and a retracted position. The frame assembly comprises a seatback frame operatively engaged with the headrest, the seatback frame being pivotable from a use position to a lowered position. A sun gear is fixed against rotation relative to the motor vehicle, and a planet gear is attached to the seatback frame and rotatably engaged with the sun gear. The planet gear is operatively engaged with the headrest to extend and to retract the headrest as the planet gear rotates about the sun ge.

3 Claims, 2 Drawing Sheets

GEAR DRIVEN ACTUATOR FOR RETRACTABLE HEADREST

TECHNICAL FIELD OF THE INVENTION

This invention relates generally to seat for motor vehicles, and relates more specifically to a gear driven actuator for a retractable headrest of a motor vehicle seat.

BACKGROUND OF THE INVENTION

Many motor vehicles, particularly sport utility vehicles and minivans, are equipped with rear seats that can be moved from a seating configuration, in which passengers can sit in the seat, to a so-called "load floor" configuration where the back support of the seat is folded downwardly to assume a horizontal orientation and thereby facilitate cargo stowage in the van. Typically, locking mechanisms are provided for holding the seat in the seating configuration, and the locking mechanisms can be released to permit moving the seat to the load floor configuration.

Various arrangements have been proposed for retracting a headrest of the seat in order to provide the seat with a more compact profile when folded. For example, U.S. Pat. No. 5,918,940 shows several embodiments of a seat having an adjusting mechanism for adjusting the height of a headrest according to the pivoting of a seatback relative to a seat cushion.

SUMMARY OF THE INVENTION

The present invention is a motor vehicle seat frame assembly having a headrest movable between an extended position and a retracted position. The frame assembly comprises a seatback frame operatively engaged with the headrest, the seatback frame being pivotable from a use position to a lowered position. A sun gear is fixed against rotation relative to the motor vehicle, and a planet gear is attached to the seatback frame and rotatably engaged with the sun gear. The planet gear is operatively engaged with the headrest to extend and to retract the headrest as the planet gear rotates about the sun gear.

Accordingly, it is an object of the present invention to provide an assembly of the type described above which could be moved to a seating configuration and to a load floor configuration.

Another object of the present invention is to provide an assembly of the type described above that presents a retractable headrest.

Another object of the present invention is to provide an assembly of the type described above that facilitates the storage of relatively compact rear seats of the motor vehicle.

Still another object of the present invention is to provide an assembly of the type described above which is easy to use and cost-effective.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
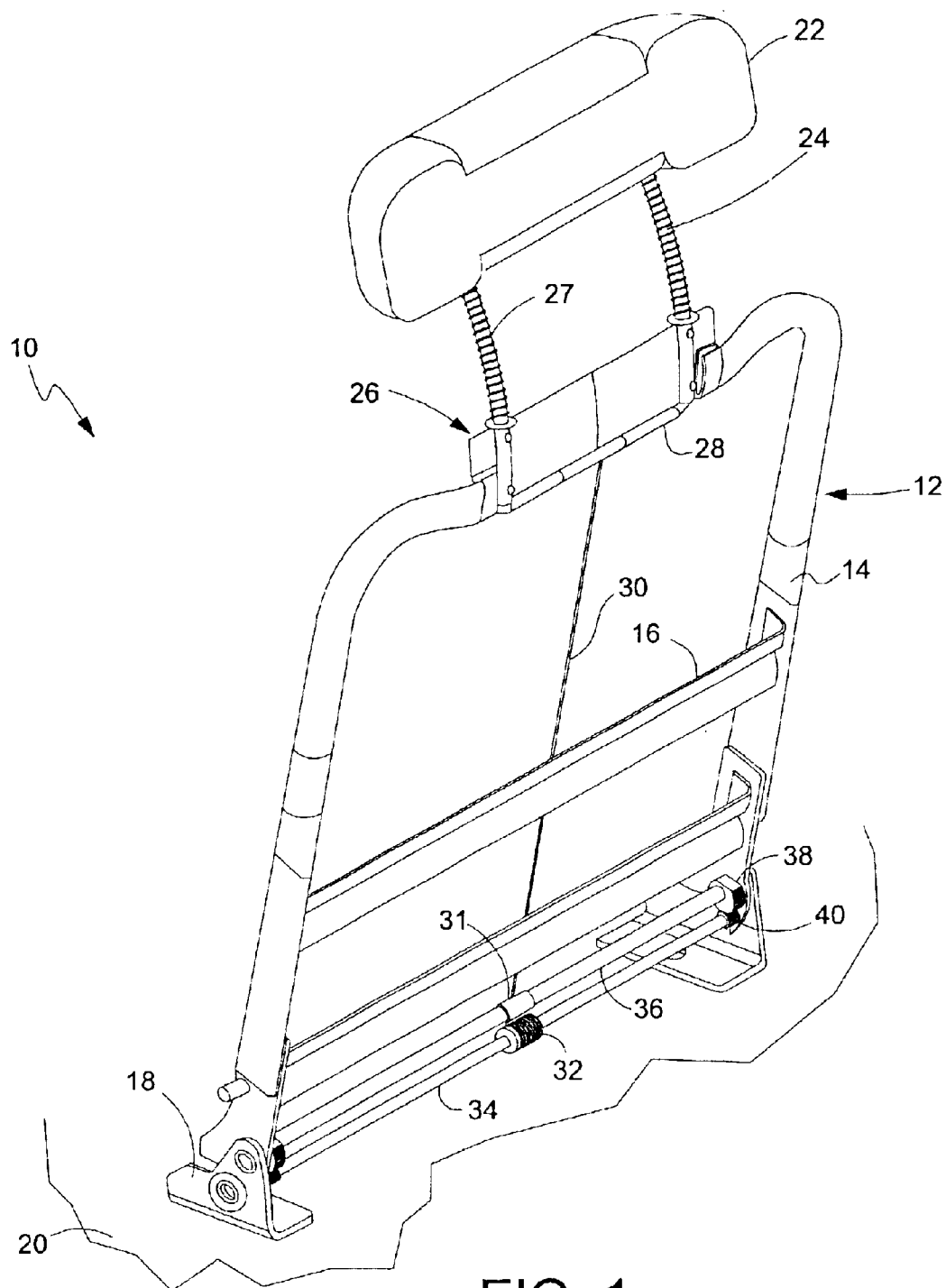
FIG. 1 is a perspective view of a frame assembly according to the present invention for a motor vehicle seat in an upright, use position with a headrest in an extended position.

FIG. 1 shows one embodiment 10 of a frame assembly according to the present invention for a motor vehicle seat. The seat frame assembly 10 includes a seatback frame 12 that may be formed of any conventional material and covered, although not shown, with a conventional foam cushion and seat cover. The seatback frame 12 preferably includes a pair of side members 14, and one or more braces 16 extending between the side members. The lower end of each side member 14 is mounted to a pivot 18, which in turn is secured to an interior load floor 20 of the motor vehicle in any known fashion. Alternatively, the pivot 18 may be attached to the frame of a generally horizontally disposed seat cushion upon which an operator of the vehicle may sit, as is also well known.

Figure 2:
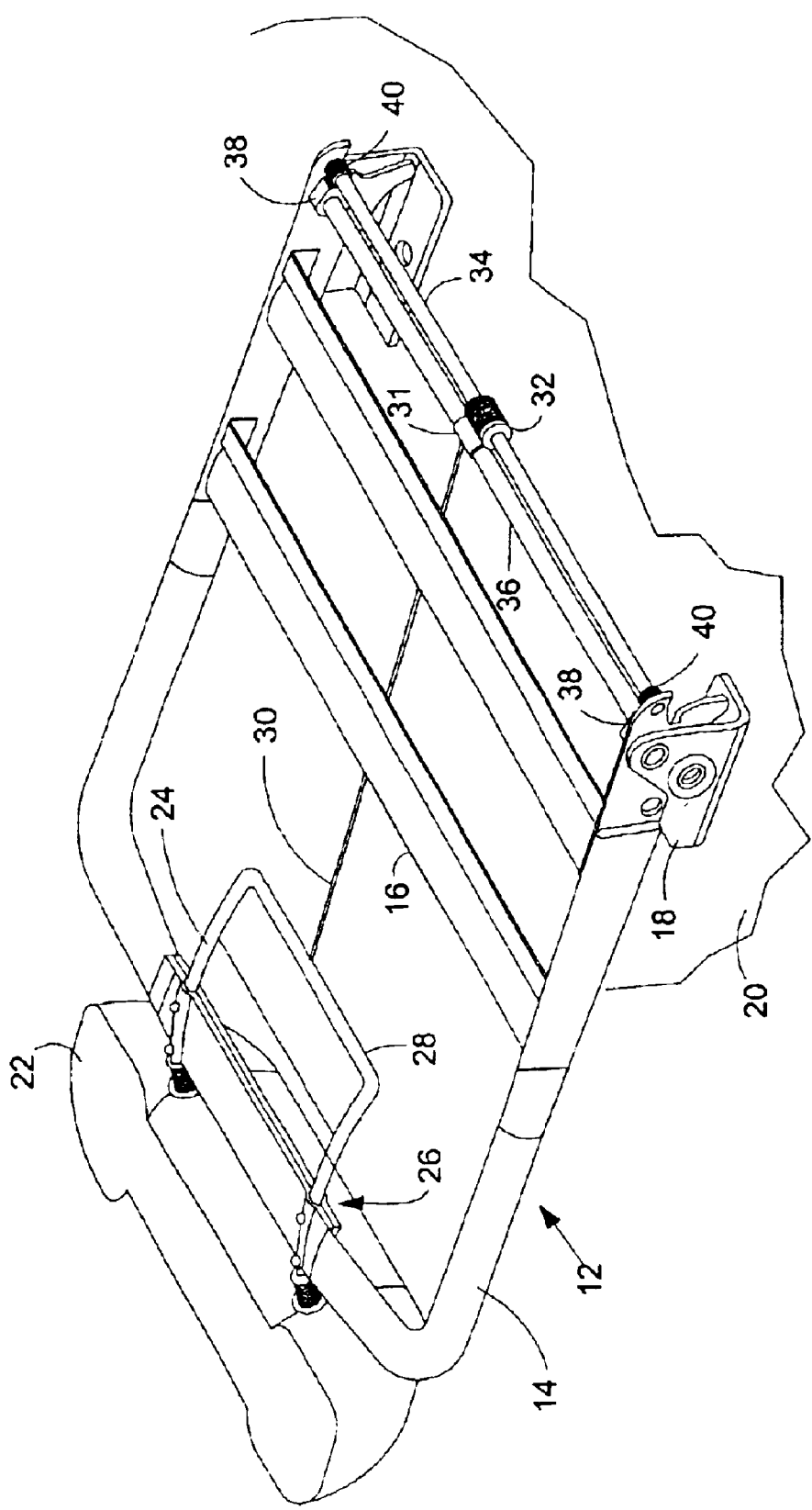
FIG. 2 is a perspective view of the frame assembly in a second, lowered position with the headrest in a retracted position.

The seatback frame 12 is pivotable about the pivot 18 between a relatively upright, operational position and a lowered, storage position shown in FIG. 2 generally parallel to the load floor 20. In the upright position, a headrest 22 is spaced above the top of the seatback frame 12 by one or more curved supports 24. The supports 24 engage a guide assembly 26, which is disposed between the side members 14 and forms the upper part of the seatback 12 frame. The guide assembly 26 includes plates that include a pair of semicylindrical tracks having a radius of curvature matched to the radius of curvature of the supports 24. Means such as springs 27, acting between the top of the plates and the bottom of the headrest 22 may be provided to bias the headrest away from the top of the seat frame. The springs 27 also tend to bias the seatback frame 12 toward the upright position. Latching mechanisms, not shown, may also be provided to latch the seatback in either or both of the upright and stowed positions. Further details of this arrangement are taught in U.S. patent application Ser. No. 10/146,362 entitled Motor Vehicle Seat Having Curved Headrest Guide, (Attorney Ref. No. 706099) the disclosure of which is hereby incorporated by reference.

The guide assembly 26 includes a lateral rod 28 that engages a headrest actuator cable 30. The cable 30 extends downwardly between the side members 14, over a positioner 31, and is connected at its lower end to a spool 32. The positioner 31 is mounted for rotation with a rod 36 that extends through the side members 14 and is non-rotatably mounted to the pivots 18. In effect, the rod 36 defines the axis of rotation of the seatback frame 12. The spool 32 is mounted for rotation with an axle 34. The axle 34 preferably extends between points proximate the lowermost ends of the side members 14, and is rotatable relative thereto. A stationary sun gear 38 is mounted near each of the opposite lateral ends of the rod 36, and includes a generally semi-circular set of external teeth. A planet gear 40 is mounted near each of the opposite lateral ends of the axle 34. Each planet gear 40 also has a set of external teeth that mesh with a respective sun gear 38.

When the seatback frame 12 is rotated from its upright position to its lowered position, the planet gears 40 travel along the sun gears 38 and rotate the axle 34, and thus the spool 32, in the counterclockwise direction as shown in the figures. The spool 32 therefore winds up the cable 30 and pulls the rod 28, and thus the supports 24 and the headrest 22, against the force of the springs 27. The positioner 31, which remains stationary during this operation, may be located to provide some mechanical advantage if so desireable. As the supports 24 are drawn through the vertical portions of the guide assembly 26, the headrest 22 is drawn closer to the top of the seatback 12. The headrest 22 desirably rests against the top of the cushion overlying the seatback frame 12 when the seatback is pivoted forward to the greatest extent possible in the particular implementation.

The present invention thus provides a headrest that may be raised and lowered, without power, as the seatback is pivoted. With the headrest in the stowed position, the seatback occupies a relatively compact space without the need for undesirable cutouts or scallops in the seat cushion.

While the embodiment of the invention disclosed herein is presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A seat frame assembly including a seat back pivotally mounted to a seat base, the seat back mounting a headrest movable between an extended position and a retracted position, wherein:

the headrest comprises a headrest support operatively engaged with the seat back and biased to the extended position by a spring bearing between the headrest and the seat back;

the seat back comprises a seat back frame pivotally mounted to a seat base frame at a pivot axis, a sun gear rigidly mounted to the seat base frame and centered on the pivot axis;

an axle rotatably mounted to the seat back frame parallel to the pivot axis;

a planetary gear fixedly mounted on the axle and engaging the sun gear;

a spool fixedly mounted on the axle; and a cable connecting the spool to the headrest, whereby pivoting of the seat back frame relative to the seat base frame from an upright position to a folded position traverses the planetary gear about the sun gear, rotating the axle and spool and pulling the cable onto the spool to move the headrest to the retracted position, and pivoting the seat back frame from the folded position to the upright position reverses the spool releasing the cable, the headrest returning to the extended position under bias by the spring.

2. The seat frame assembly of claim 1, wherein the headrest support is slidably engaged with the seat back.

3. The seat frame assembly of claim 1, further comprising a positioner, the cable being routed over the positioner, whereby the positioner provides a mechanical advantage during pivoting of the seat back frame from the upright position to the folded position.

* * * * *